US007599261B2

(12) United States Patent
Achanta et al.

(10) Patent No.: US 7,599,261 B2
(45) Date of Patent: Oct. 6, 2009

(54) REMOVABLE STORAGE MEDIA WITH IMPROVED DATA INTEGRITY

(75) Inventors: Phani Gopal V. Achanta, Austin, TX (US); Mark Joseph Hamzy, Round Rock, TX (US); Scott Thomas Jones, Austin, TX (US); Steven L. Pratt, Leander, TX (US)

(73) Assignee: International Business Machines Corporation, Armonk, NY (US)

( * ) Notice: Subject to any disclaimer, the term of this patent is extended or adjusted under 35 U.S.C. 154(b) by 571 days.

(21) Appl. No.: 11/334,702

(22) Filed: Jan. 18, 2006

(65) Prior Publication Data
US 2008/0123503 A1    May 29, 2008

(51) Int. Cl.
G11B 7/00 (2006.01)
G11B 5/86 (2006.01)
(52) U.S. Cl. .................................... 369/47.12
(58) Field of Classification Search ............ None
See application file for complete search history.

(56) References Cited

U.S. PATENT DOCUMENTS

| 6,061,194 | A | 5/2000 | Bailey |
| 6,298,425 | B1* | 10/2001 | Whitaker et al. ............ 711/162 |
| 6,412,042 | B1* | 6/2002 | Paterson et al. ............. 711/112 |
| 6,546,499 | B1 | 4/2003 | Challener et al. |
| 6,967,802 | B1 | 11/2005 | Bailey |
| 7,349,623 | B1* | 3/2008 | Fujita et al. ................... 386/95 |
| 2003/0101318 | A1* | 5/2003 | Kaga et al. ................... 711/114 |
| 2004/0083335 | A1* | 4/2004 | Gonzalez et al. ............ 711/103 |
| 2005/0278482 | A1* | 12/2005 | Ohtsubo et al. ............. 711/113 |

OTHER PUBLICATIONS

Hall, "System and Method for Efficient Redundancy on a Single DASD", RD No. 439, Article 130, Nov. 2000, p. 2010.

* cited by examiner

*Primary Examiner*—Peter Vincent Agustin
(74) *Attorney, Agent, or Firm*—Yee & Associates, P.C.; Matthew W. Baca

(57) ABSTRACT

A technique for storing or backing up data to a removable media such as a CD or DVD with an enhanced probability that such data can be successfully read or recovered from such media subsequent to the writing/storing/backing-up of the data. This enhanced probability is achieved by storing the data to be copied to the media in multiple different physical locations of the media, such that a plurality of duplicate copies of the data exists on the media. Because there are multiple copies of the data stored on the media, the probability of being able to successfully read at least one good copy of the data is enhanced. For example, if one of the copies cannot be successfully read due to an unrecoverable error, another of the copies can be used to satisfy the read or restore operation. It is also possible to read all copies of the data in response to a read/restore operation, and any differences in the read data will indicate an error with at least one of the copies. Selection of which copy to select and use to satisfy the read request is based on a vote, where the copies are matched against one another, and the copy having the most matches with other copies is deemed to be the good copy and is used to satisfy the read or restore operation.

11 Claims, 8 Drawing Sheets

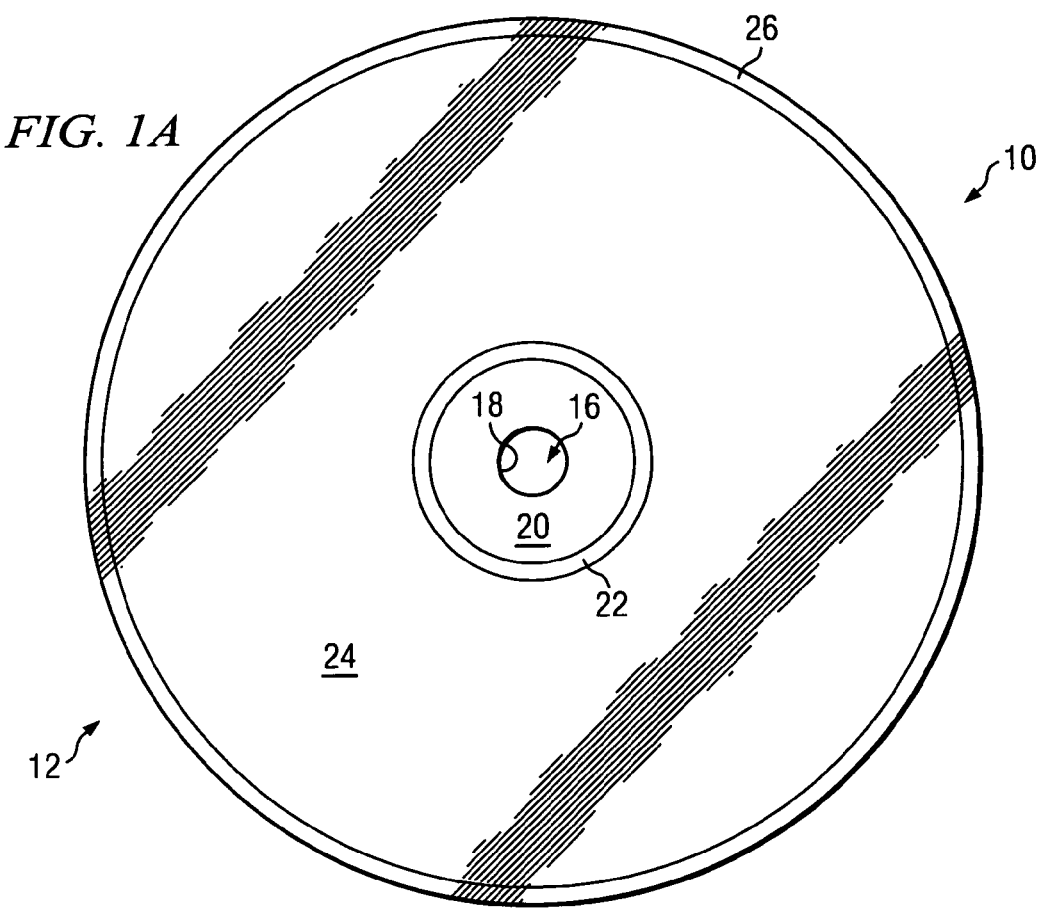
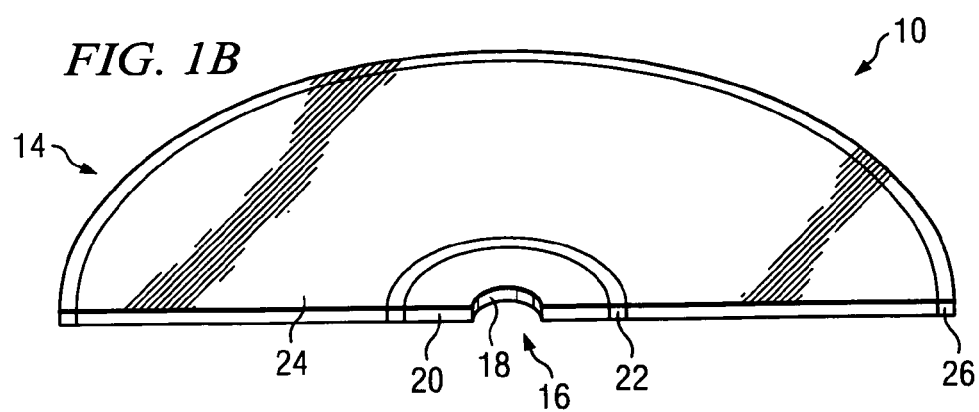

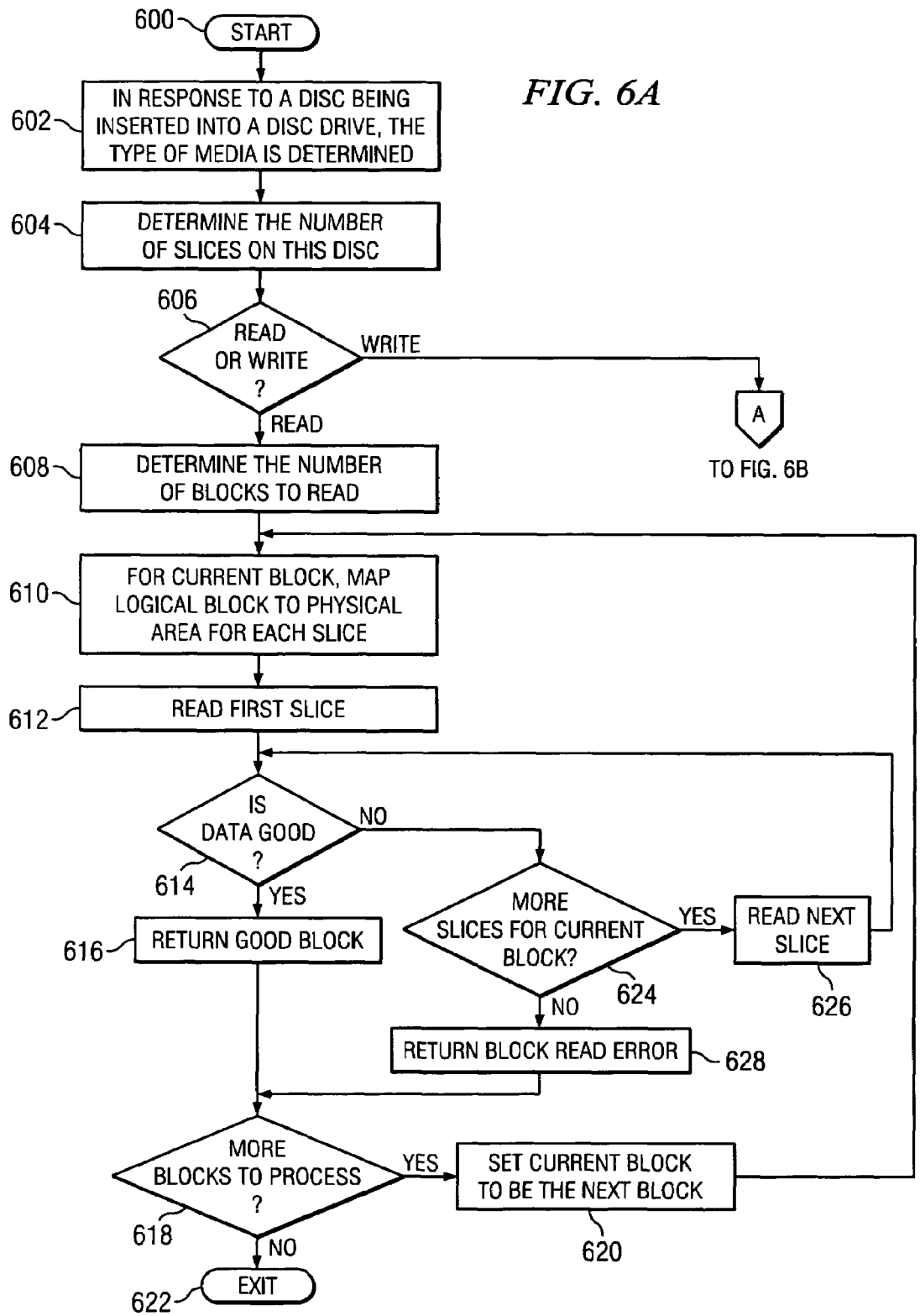

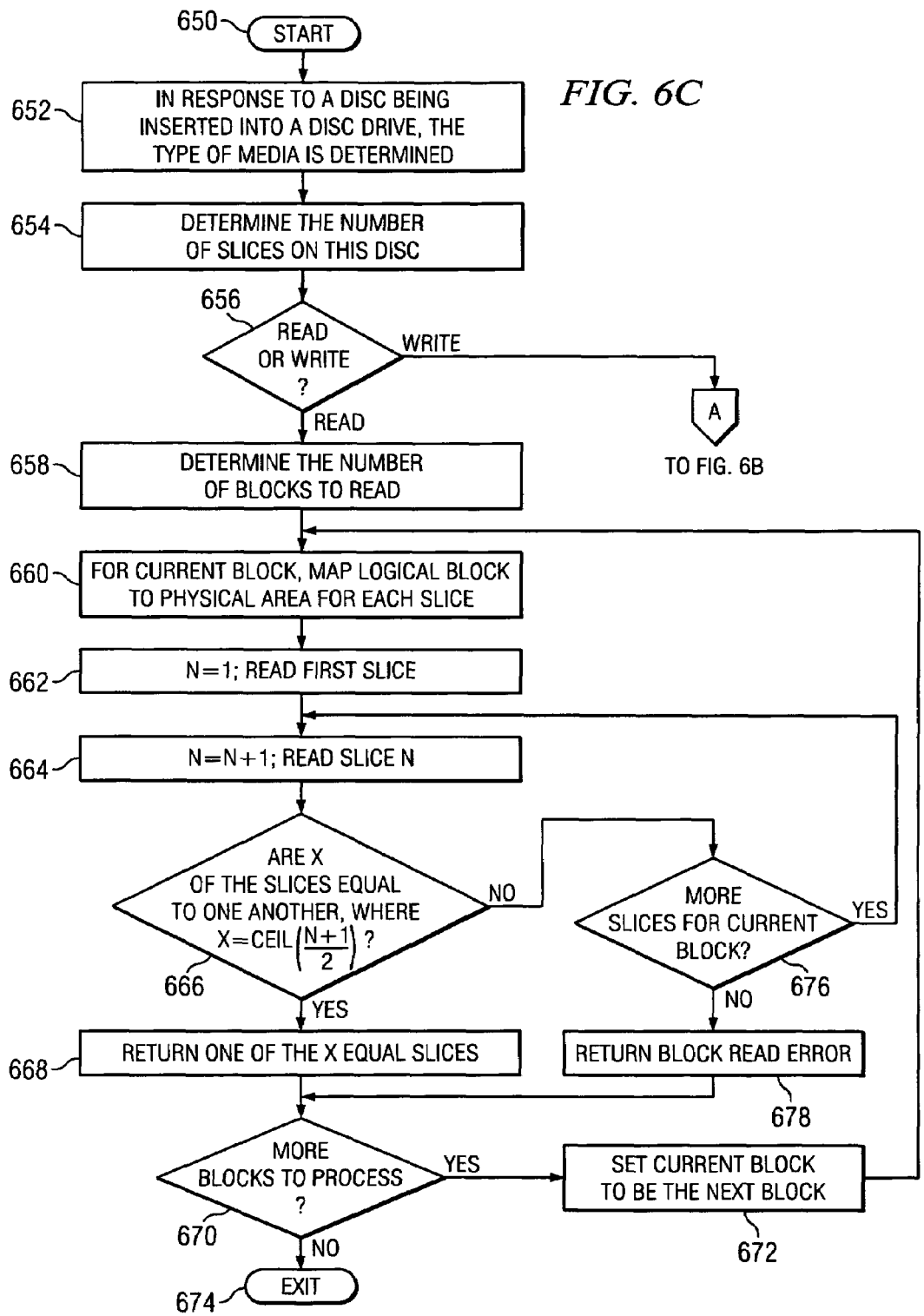

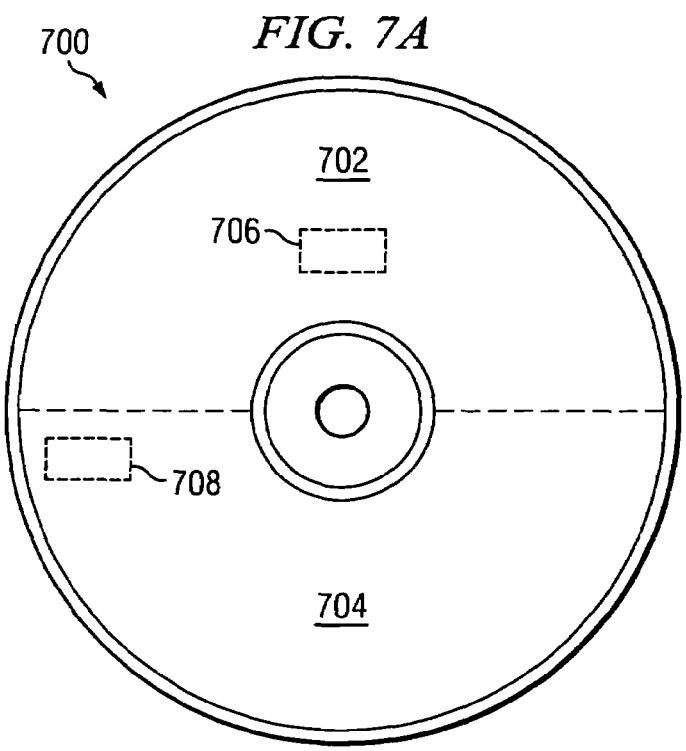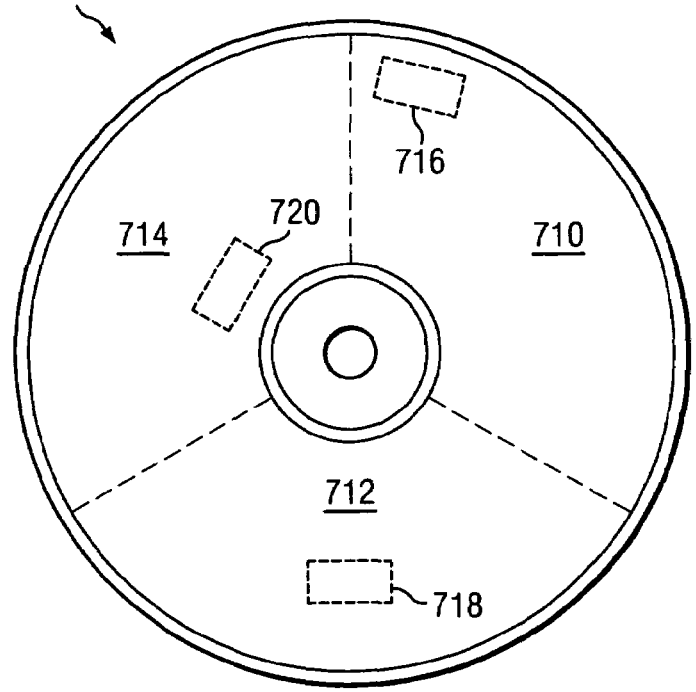

REMOVABLE STORAGE MEDIA WITH IMPROVED DATA INTEGRITY

BACKGROUND OF THE INVENTION

1. Field of the Invention

The present invention relates generally to techniques for saving and restoring data, and more particularly the present invention relates to a computer implemented method, system and computer usable program code for improving integrity of data stored on removable storage media such as compact discs and digital versatile/video discs.

2. Description of the Related Art

As data storage densities continue to increase, greater and greater amounts of data can be stored in smaller and smaller containers. For example, today's single-sided, single-layer digital versatile/video disc (DVD) can hold 4.7 gigabytes (GB) of data. In the near future, a single-sided, single-layer HD DVD will hold 15 GB of data, and a comparable Blu-ray Disc will hold 25 GB of data. While not having the same capacity as DVDs, compact discs (CDs) are also useful for saving data due to their relatively low costs.

Use of removable storage media in a multitude of devices is also increasingly common. Digital cameras and camcorders, portable music devices, and electronic games are but a few examples of such use. For non-volatile memory such as compact flash (CF), there is a need to be able to save the current data contents of the non-volatile memory so that the non-volatile memory can be erased and re-used. Storing of such data on a CD or DVD, with the aid of a computer or copying device, is an extremely cost effective way to store or archive such data for subsequent restore or recall.

Still further, removable disc storage media, with its increase in capacity, is now a viable alternative for use in backing up data from another storage device such as a magnetic or optical hard disk drive.

In short, the use of high-density removable media is rapidly increasing. However, with such increased use comes associated risk. Because these media contain so much data, media defects or a natural aging process can result in the loss of significant amounts of data. Such data loss comes from things such as physical damage of the media (breaking, melting, scratching) by careless or improper handling or use of the media, or blocking of the laser light used to access the media (by dirt, paint, ink, glue, or corrosion of the reflecting layer). Certain defects may even exist on raw, never-written or never-used media due to manufacturing defects. Certain techniques are used today to help mitigate such data loss, such as correcting detected errors using algorithmic processes such as error-control and correction (ECC). However, such ECC coding can only handle so much damage before an unrecoverable error occurs.

It would thus be desirable to provide an improved technique for ensuring that data that is copied, backed-up, or migrated to a removable disc such as a CD or DVD can be successfully read or recovered at some future point in time.

SUMMARY OF THE INVENTION

The present invention is directed to a computer implemented method, system and computer usable program code for writing, storing or backing up data to a removable media such as a CD or DVD with an enhanced probability that such data can be successfully read or recovered from such media subsequent to the writing/storing/backing-up of the data. This enhanced probability is achieved by storing the data to be copied to the media in multiple different physical locations of the media, such that a plurality of duplicate copies of the data exists on the media. Because there are multiple copies of the data stored on the media, the probability of being able to successfully read at least one good copy of the data is enhanced. For example, if one of the copies cannot be successfully read due to an unrecoverable error, another of the copies can be used to satisfy the read or restore operation. It is also possible to read all copies of the data in response to a read/restore operation, and any differences in the read data will indicate an error with at least one of the copies. The determination of which copy to select and use to satisfy the read request is based on a vote, where the copies are matched against one another, and the copy having the most matches with other copies is deemed to be the good copy and is used to satisfy the read or restore operation.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 1A-1B depict a removeable disc media, both a top view and a cut-away view;

FIGS. 6A-6C depict a flow diagram of a procedure for restoring/retrieving/reading and backing-up/storing/writing a plurality of duplicate copies of a data file at a plurality of different physical locations on a disc media; and FIGS. 7A-7D depict various configurations for how to logically segment or slice a physical disc media to define a plurality of different physical locations on such media, along with associated header information for each slice or segment.

DETAILED DESCRIPTION OF THE PREFERRED EMBODIMENT

Figure 2:
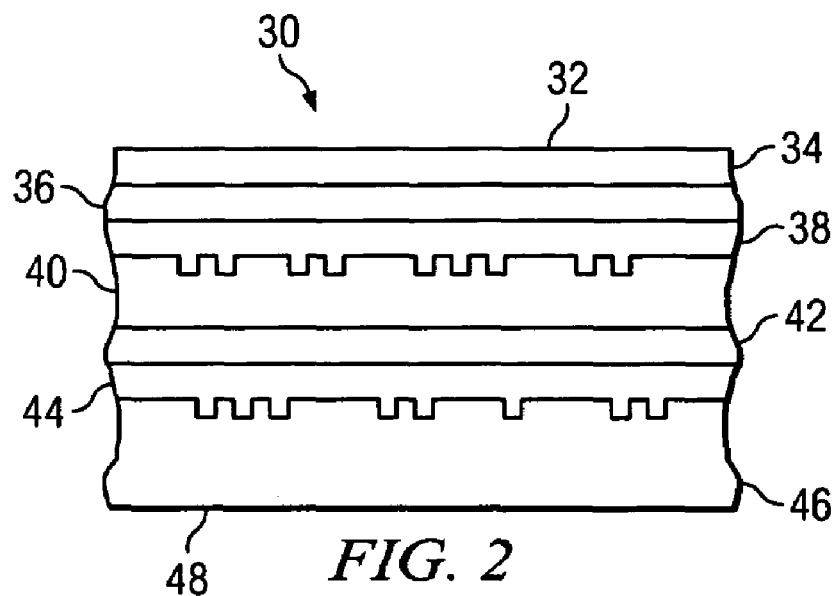
FIG. 2 depicts a cross-section of a disc media having a plurality of recordable layers.

Referring now to FIGS. 1A and 1B, there is depicted at 10 a standard compact disc (CD) or digital versatile/video disc (DVD) used for storing data such as pictures, music, movies, files, etc. Such devices have one or more recording layers inside the media, and sandwiched between a protective overcoat such as a polycarbonate substrate, as further described below. While a standard CD and DVD have the same external physical dimension or form-factor, CDs do not have the storage capacity of DVDs as the amount of physical space used to store a piece of data is larger than the physical space required by a DVD. This difference in physical space is dictated by the type of laser used to write and read the data, and in particular the laser frequency that is used for such writing and reading. Less precise, and hence lower-cost, lasers are used for CDs—which is a substantial reason as to why CDs cost less than DVDs. The recording density of these disc devices is also dictated by whether data can be recorded on one or two sides of the recording layer, as well as the number of individual recording layers (either single or double sided) within the device.

Continuing with FIGS. 1A and 1B, the layout of the CD/DVD 10 is as follows. A top view is shown at 12 of FIG. 1A, and a cut-away view rotated slightly to show the thickness of the media as a third dimension is shown at 14 of FIG. 1B. Starting at the middle or center of media 10, and working toward the outer periphery, there is shown at 16 a center hole defined by outer hole periphery 18. Extending from outer hole periphery 18 to lead-in area 22 is substrate or plastic material 20. Lead-in area 22 is an area that allows laser calibration with the media, allowing the laser head to follow the programming pattern of pits in order to synchronize to the program or computer data before the start of program area 24. The lead-in area may also contain media metadata such as a table of contents. Program area 24 is the primary data storage area of the media, and contains the actual data stored on the media for subsequent retrieval. This program area is further divided (not shown) into a plurality of concentric tracks, each containing a physical area for storing a stream or bit-sequence of data. Following program area 24 is lead-out area 26 that defines the end of the program area and contains digital silence or zero data.

Turning now to FIG. 2, there is shown at 30 a cross-sectional area of a very small portion of program area 24 of FIG. 1, greatly exaggerated to show the details therein. Protective lacquer layer 32 covers the top surface. Below the protective layer is polycarbonate substrate 34, followed by reflective layer 36. This reflective layer reflects a light, emitted from a laser (not shown) positioned below bottom surface 48, as determined by the pits on recording layer 38. These pits and the absence of pits are representative of the data stored in program area 24 of FIG. 1. Below recording layer 38 is a layer of polycarbonate substrate 40. Although not shown in this Figure because this Figure depicts a dual-recording layer, for a single recording layer such as is found in CDs, this polycarbonate substrate would extend all the way to bottom surface 48. For a DVD having two recording layers (as shown in this FIG. 2), another partially-reflective layer 42 is positioned below first recording layer 36. This layer is partially-reflective, in that the laser used to access first recording layer 38 must substantially pass through this partial-reflecting layer without interference by partial-reflective layer 42. A different laser (not shown) having a different frequency is used to access second recording layer 44 using this partially-reflective layer 42. This partially-reflective layer 42 reflects a light, emitted from such second laser (also positioned below bottom surface 48), as determined by the pits on recording layer 44. Below second recording layer 44 is another polycarbonate substrate 46 extending to bottom surface 48. Use of multiple-layers, with associated multiple lasers, allows for increasing the density of the data stored on the media as the physical surface for storing data, via the pits, is essentially doubled by adding an additional layer. Density is further increased in that the laser frequency for the second layer used to access the second recording layer is typically such that the pits can be packed closer together (i.e. a higher spatial density), further increasing the data density of the storage media. Using these techniques, it is possible to build media having more than two-layers, further increasing densities as well as providing media which is compatible with dissimilar technologies, such as CD and DVD, or DVDs supporting high definition video programming such as HD-DVD and Blu-ray DVD.

The present invention advantageously utilizes many characteristics of the above described media discs in order to spatially separate multiple identical copies of data to be stored on the media to provide data redundancy. The data redundancy directly results in improved data integrity, as a redundant copy of the data can be used if one of the data copies is determined to be defective or faulty.

Figure 3:
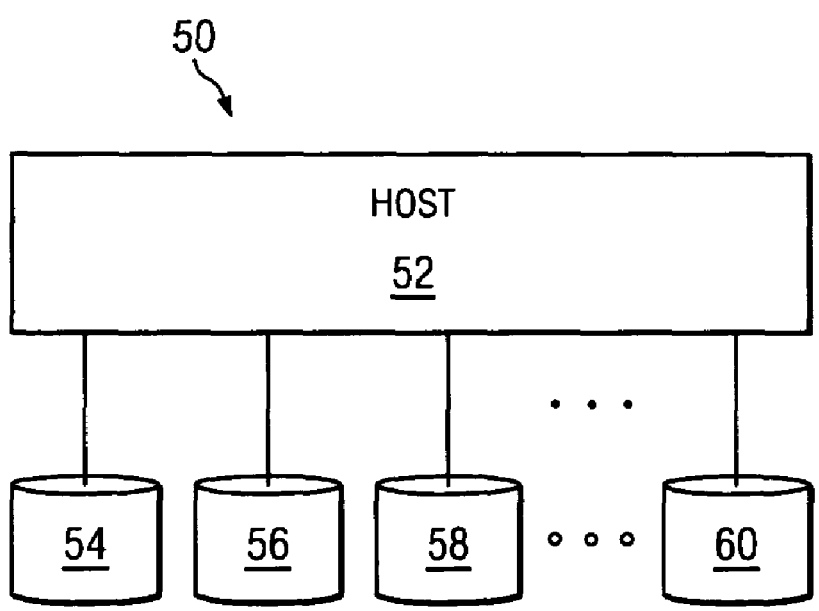
FIG. 3 depicts a RAID storage sub-system.

Turning now to FIG. 3, there is shown at 50 a related data redundancy system used to improve data integrity, where multiple copies of data are stored on a plurality of different storage devices. Known as RAID (redundant array of independent disks), both the original data and redundant data (either duplicate data or parity data that can be used in conjunction with the original data to restore defective data) are stored on a plurality of disk drives. Data to be saved or backed-up is typically receiving from a host data processing system by RAID controller 52, which manages how to store the original and redundant data across a plurality of disk drives such as 54, 56, 58 and 60. There are several different types of RAID architectures or techniques, each offering various cost-benefit and performance trade-offs. For example, RAID 1 uses a concept of data mirroring, which duplicates data from a single logical drive across two physical drives such as drive 54 and 56. This creates a pair of drives that contain the same data. If one of these physical devices fails, the data is still available from the remaining disk drive. RAID 3 stripes data across all the data drives. Parity data is stored on a separate parity drive. The parity data can be used to reconstruct the data if a single disk drive fails. RAID 4 is similar to RAID 3, except that it used block-level striping of data across the drives instead of the byte-level striping as is done with RAID 3. Use of larger blocks for data striping improves performance. RAID 5 uses block-level striping and distributed parity. Both the data and parity information are spread across all the disks, thereby eliminating the dedicated parity disk bottleneck that can occur in RAID 3 and RAID 4, as well as eliminating the extra, dedicated parity disk. RAID 5E, or enhanced RAID 5, is similar to RAID 5 but uses a spare drive (which would otherwise be unused, but in existence to allow for use in the event of drive failure) as an active drive, also known as a hot-spare drive, thereby adding an additional drive and head for performance enhancement. RAID 0 should be mentioned for completeness, although it does not provide data redundancy. Instead, it allows multiple physical drives to be concatenated together to form a large logical drive, and data striping is used to interleave blocks of data across the drives. This layout thus improves performance, in that a sequential read of data on the logical drive results in parallel reads to each of the physical drives.

The preferred embodiment of the present invention utilizes the RAID 1 architecture to mirror duplicate copies of data of alternative physical locations within a single, removable disk media. While RAID 1 is the preferred embodiment, one of ordinary skill in the art will recognize, with the benefit of the presently described invention and accompanying techniques, that other types of RAID such as RAID 3, 4 and 5 could be used to provide the requisite data redundancy needed to recover data in the event of data failure due to defect or malfunction.

Figure 4:
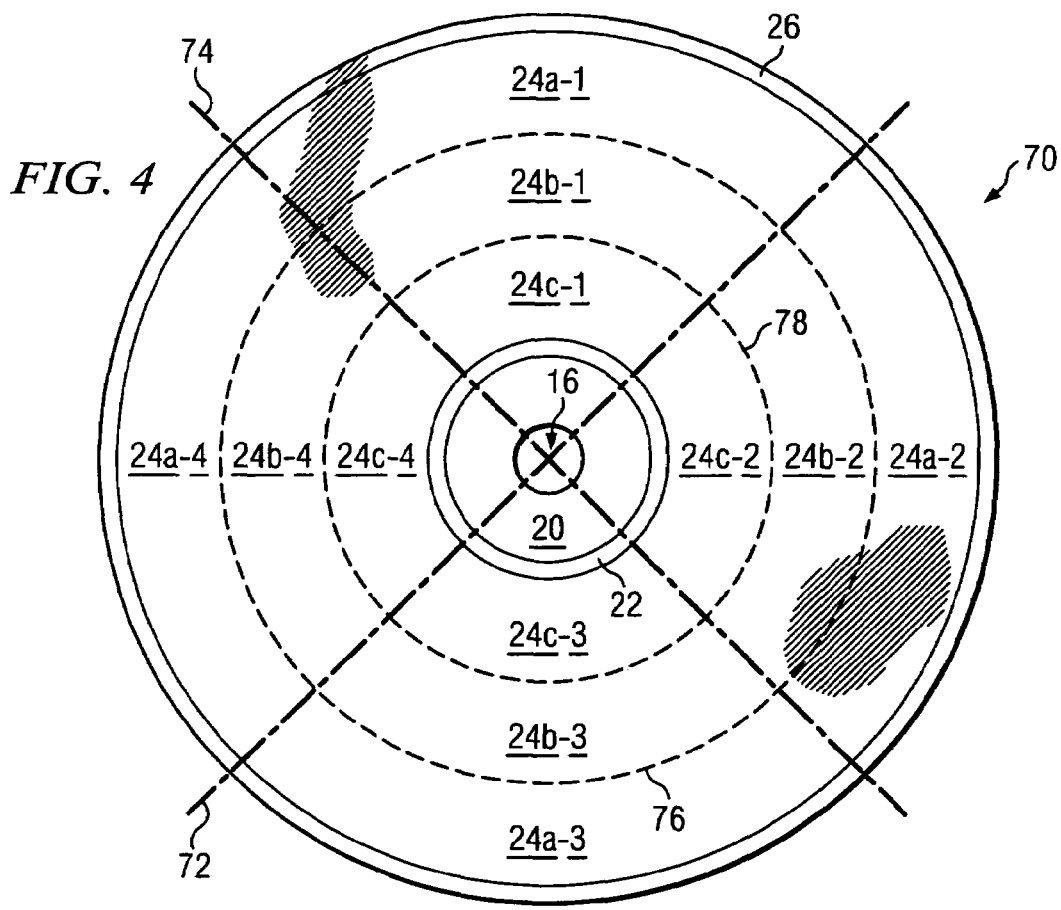
FIG. 4 depicts a disc media having a plurality of physical storage regions.

Turning now to FIG. 4, there is shown at 70 a removable disk media such as a CD or DVD as shown at 10 in FIG. 1. Similar to that shown in FIG. 1, disk media 70 includes center hole 16, surrounding by lead-in area 22, which is surrounded by program area 24 (shown by the conglomerate of 24$a$-1, 24$b$-1, 24$c$-1, 24$a$-2, 24$b$-2, 24$c$-2, 24$a$-3, 24$b$-3, 24$c$-3, 24$a$-4, 24$b$-4 and 24$c$-4). Program area 24 has been logically divided using quadrant bisecting lines 72 and 74, into four pie-shaped quadrants represented by suffixes '-1', '-2', '-3' and '-4' in the reference numerals for program area 24. Program area 24 has also been logically divided using concentric circles 76 and 78 into three concentric cylinder regions represented by 'a' (the outer), 'b' (the middle) and 'c' (the inner) immediately following the reference numeral 24 for program area 24. The pie-shaped quadrants and cylinder regions will be described more fully below, and at times will be referred to generically as slices. Program area 24 is surrounded by lead-out area 26, as previously described with respect to FIG. 1.

The slices of pie-shaped quadrants and concentric cylinder regions provide physical boundaries that are used to organize and segregate a plurality of copies of a data file to be written on storage media 70. For example, a first copy of a file could be written to region 24a-1, while a second copy could be written to region 24b-1, and a third copy could be written to region 24c-1. Thus, each of the three copies would be located at different radial distances from the center of the disc, providing protection in case the disc has a failure or defect at a given radial position. While this example contemplates the three files being written at different radial distances within a given quadrant, a further refinement would be to ensure that the duplicate files are stored in both different radial distances from the center of the media and in different quadrants, thereby providing further physical separation of the duplicate files. For example, the first copy of the file could be stored at 24a-1, the second copy stored at 24b-2 and the third copy stored at 24c-3. While four pie-shaped quadrants and three concentric cylinder regions are depicted in the preferred embodiment, other slice physical boundaries having fewer or more regions are possible using the techniques contemplated by the present invention, including angular separation with non-linear boundaries as further described below with respect to FIG. 7D.

Figure 5:
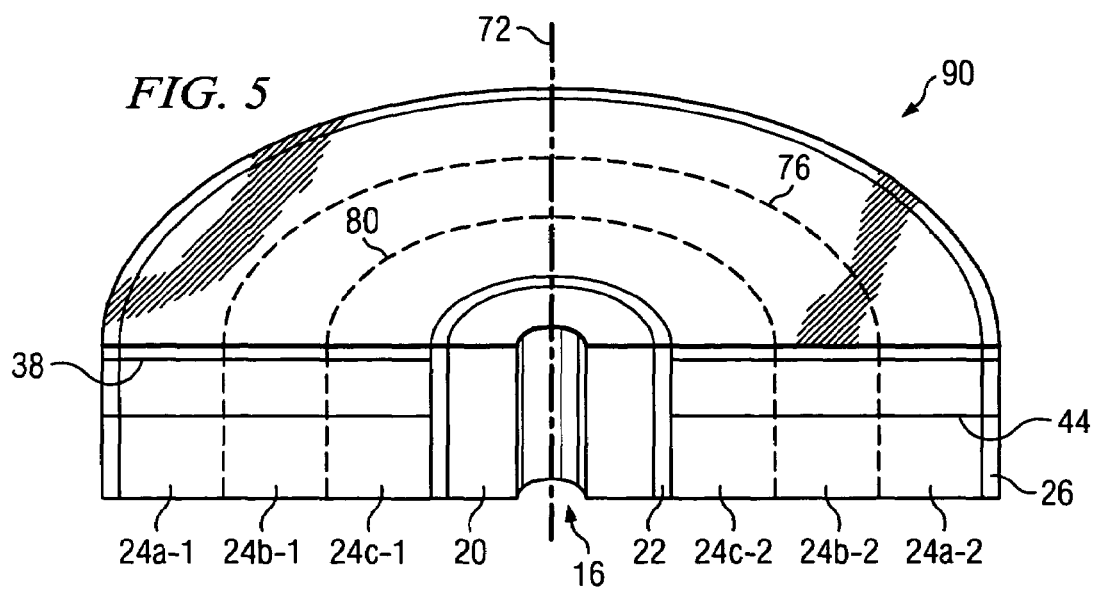
FIG. 5 depicts a cut-away view of disc media having a plurality of physical storage regions and a plurality of recordable layers.

In addition, and as shown by media 90 in FIG. 5, the physical separation between duplicate copies of the files could also be provided through use of various internal recording layers 38 and 44 within the media, thereby providing three-degrees of separation—radial separation, angular separation and depth separation. For example, a first copy of the data could be stored in region 24a-1 on recording layer 38, a second copy of the data could be stored in region 24c-1 on recording layer 44, and a third copy of the data could be stored in region 24-2 on recording layer 38, thus providing three degrees of physical separation between the redundant copies of the data file. The use of internal recording layers and their associated segmented recording regions are also part of the generic terminology covered by the terminology of slice or slices, which are the individual segments defined to hold duplicate copies of data.

Figure 6B:
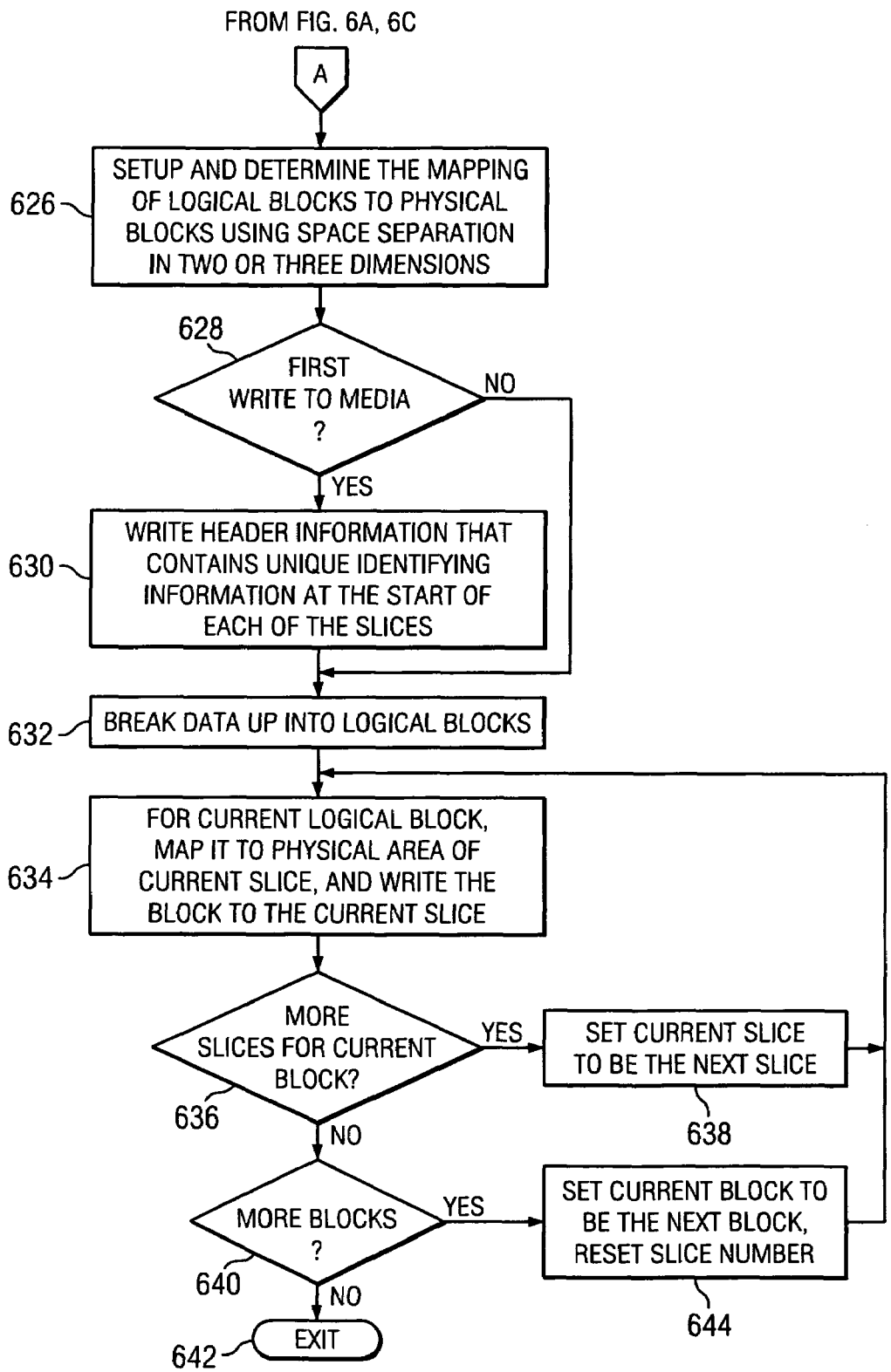

The method for reading and writing redundant copies of data will now be described with respect to FIGS. 6A-6C. The process begins at 600 in FIG. 6A, and continues to 602 where the media type, such as CD or DVD (and type of DVD) is determined when the media is inserted in a disk drive. At 604, a determination is made as to either the number of slices currently on the disc, or the number of slices to be used on the disc. The methodology then diverges at 606, depending upon whether this is a read or a write operation to be performed on the disc. If a read operation, processing continues at 608, where a determination is made as to how many blocks are to be read. Beginning with the first block to be read, and at 610, the current logical block is mapped to a physical area for each of the slices (as determined at 604). The first slice is then read at 612. If the data read from that slice is good, as determined at 614, it is used or presented to the requester to satisfy the read request at 616, and a determination is then made at 618 if there are more logical blocks to process. Such a 'good' determination is based on reading data without an error indication, or use of either a standard CRC detection technique or an ECC error correction technique. If there are more logical blocks to process at 618, the current block indicator or pointer is set to point to the next block at 620, and processing continues at 610 for this next block. If not, all blocks have been processed, and the routine exits at 622. Returning back to block 614, where data read from the current slice is checked to see if the data is good, if the data is not good, processing continues at 624 where a determination is made as to whether there are more slices for the current logical block. If so, processing continues to block 626 where the next slice for the current logical block is read, and processing then continues at block 614 as described above. If decision block 624 indicates that there are no more slices for the current logical block, then all slices for this block have been read and none of them were indicated as being a good block, so a block read error is returned at 628, and processing then continues at 618 to continue processing a next logical block, as previously described. The logical flow shown in FIG. 6A is a 'fast' method for processing a read request. An alternate 'slow' method for processing a read request will be later described with respect to FIG. 6C.

Returning back to block 606, where a determination is made as to whether this is a read or write operation, if this is a write operation processing continues at 626 of FIG. 6B, where the mapping of logical blocks to physical blocks is established using physical space separation in either two or three dimensions. Then, at 628, if this is the first write operation to the media, the media needs to be initialized with slice or segment information (somewhat akin to an initial format of a magnetic media) at 630, where header information is written to each of the slices, the header information containing unique slice identification information of what portions of the physical media are considered a part of this slice. After such slice initialization, or if the media has already been written to (and thus has already been slice-initialized per 630), processing continues at 632, where the data to be written to the disc is broken up into logical blocks. Then, and starting with the first logical block, the current logical block is mapped to a physical area of the current slice, and written to the current slice at 634. Next, at 636, a check is made as to whether there are any more slices to be written with the current logical block (i.e. whether any more duplicate copies of the logical block need to be written to other physical locations on the drive). If there are more slices to be written, processing continues at 638, where the current slice pointer or indicator is set to point to the next slice to be written. Processing then continues at 634, which has been previously described. If there are not more slices to be written with the current logical block, processing continues at 640 where a determination is made as to whether there are any more logical blocks to process for the current data write operation. If not, the process is complete and exits at 642. If so, the current block pointer or indicator is set to point to the next logical block of the data to be written at 644, and processing continues at 634, which has previously been described.

Turning now to FIG. 6C, there is depicted an alternate embodiment for processing a read request, but in this instance, the 'read' operation is slower than that described above with respect to FIG. 6A. The read process as described with respect to FIG. 6A reads slices until a good slice is read, as indicated by its CRC, where processing then ends upon returning the good read slice. The read processing as now described with respect to FIG. 6C is slower in that instead of using the CRC for each slice read, read processing ends and a good read slice is returned when a majority of the currently read slices match with one another—i.e. majority voting is used to determine which read slice to return. For example, if three slices have been read, then two of the three slices (a majority) must match and one of these two matching slices is returned in response to the read request. Similarly, if four slices have been read, then three of the four slices (a majority) must match and one of these three matching slices is returned in response to the read request.

Continuing with FIG. 6C, the operations with respect to blocks 650-660 are the same operations as described above with respect to blocks 600-610 of FIG. 6C, and are merely repeated here for completeness with the overall processing of a received request for a read or write operation. If this is a read operation, in this alternate 'slow' majority embodiment, processing deviates from FIG. 6A at block 662, where slice counter N is initialized to 1 and the first slice for the current logical block is read. Then, at 664, the slice counter is incremented and the next slice for the current logical block is read. A majority vote determination is then made at block 666, where it is determined if a majority (i.e. more than half) of the currently read slices are equal (or have the same data) to one another. This operation is preferably done using the 'ceil( )' function, which returns the next highest integer value for whatever parameter is passed to it. For example, passing a value of 3.5 would result in 4 being returned. This is the number of votes needed to satisfy the majority vote test. For example, if this is the first pass through this loop, and N=2 (2 slices have been read), then (N+1)/2 would result in 3/2 which is equal to 1.5. Passing this 1.5 to the ceil function (a.k.a. the ceiling function) returns a value of 2 (the next highest integer) and therefore there must be at least two (2) slices that are equal to one another in this first pass to satisfy the majority vote. If so, then processing continues at 668 where one of these two good slices are returned (since they are equal to one another, only one needs to be returned). A determination is then made at 670 if there are more logical blocks to process to satisfy the read request, and if so the current block indicator or pointer is set to point to the next block at 672, and processing continues at 660 for this next block. If not, all blocks have been processed, and the routine exits at 674. Returning back to block 666, where the majority vote determination was made, if a majority of the currently read slices are not equal to one another, then processing proceeds to block 676 where it is determined if there are any more slices for the current block. If so, processing continues at 664 to read the next slice, as previously described. If decision block 676 indicates that there are no more slices for the current logical block, then all slices for this block have been read and a majority of these read slices were not equal to one another, so a block read error is returned at 678, and processing then continues at 670 to continue processing a next logical block, as previously described.

Alternatively, instead of using a majority vote that requires a majority of the currently read slices to be equal (or have the same data) to one another, a plurality vote can be used. In such a plurality voting system, the winning/good copy is the copy having the most matches amongst the currently read slices even if not greater than 50%. For example, if six (6) slices are read and three (3) of these slices match one another, two (2) others of the slices match one another, and the remaining slice doesn't match any others, any of the three matching slices would be deemed to be good in such a plurality vote as they have the most matches among the read data slices.

Figure 7C:
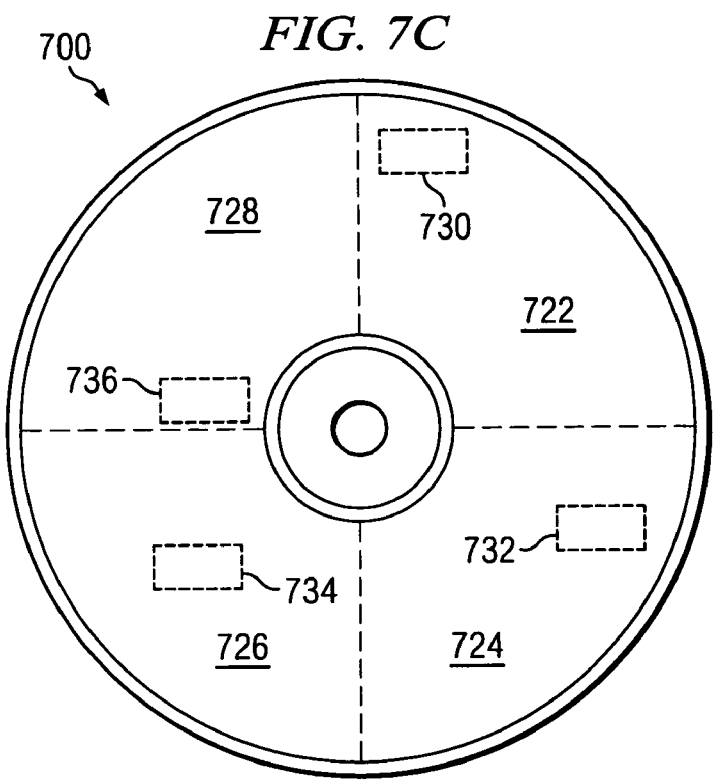

FIGS. 7A-7D show various configurations of how the slices or segments can be defined for a physical media (without taking into account any underlying, plurality of recording layers, which can each themselves be similarly configured). FIGS. 7A-7D also depict examples of where header information can be written to each of the slices, such header information containing unique slice identification information of what portions of the physical media are considered a part of each given slice. Turning now to FIG. 7A, there is shown a removable storage media 700 configured as having two slices 702 and 704. Slice 702 has its header 706 defined to be at a middle portion of slice 702. Slice 704 has its header 708 defined to be at a start portion of slice 704. In the preferred embodiment, the control program maintains, for each of the slices, where the slice header or signature information is maintained within each slice (as established in step 630 of FIG. 6B), and is used in locating and verifying slice header/signature information for each of the particular slices.

FIG. 7B shows a removable storage media 700 configured as having three slices 710, 712 and 714. Slice 710 has its header 716 defined to be at a beginning portion of slice 710. Slice 712 has its header 718 defined to be at a middle portion of slice 712, and slice 714 has its header 720 defined to be at an end portion of slice 714. Similar to FIG. 7A, the definitions of where these header locations exist within a slice or segment are preferably maintained in the metadata area within lead-in area 22 of FIG. 1.

FIG. 7C shows a removable storage media 700 configured as having four slices 722, 724, 726 and 728. Slice 722 has its header 730 defined to be at a beginning portion of slice 722. Slice 724 has its header 732 defined to be between a start and middle portion of slice 724, slice 726 has its header 734 defined to be at a middle portion of slice 726, and slice 728 has its header 736 defined to be at an end portion of slice 728. Similar to FIGS. 7A-7B, the definitions of where these header locations exist within a slice or segment are preferably maintained in the metadata area within lead-in area 22 of FIG. 1.

Figure 7D:
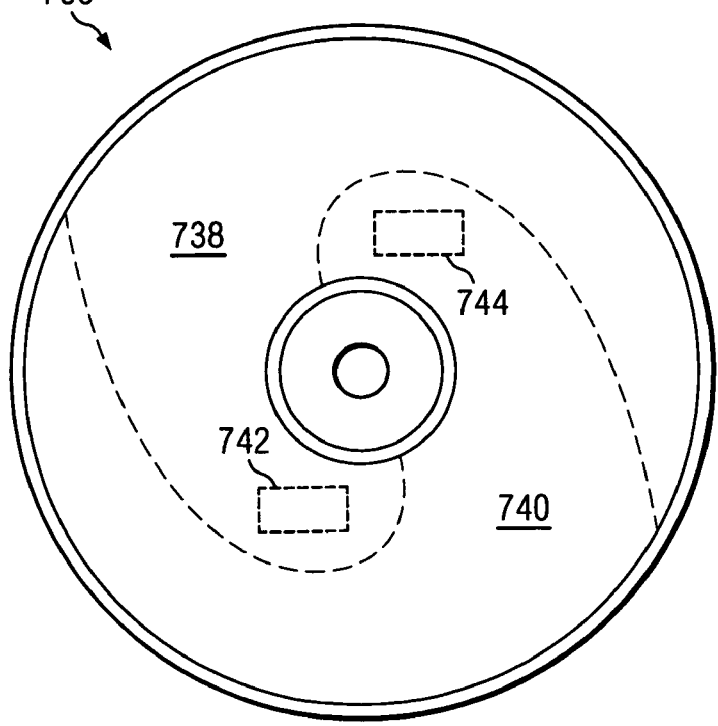

FIG. 7D shows a removable storage media 700 configured as having two equal or symmetrical slices 738 and 740. Slice 738 has its header 742 defined to be at an end portion of slice 738, and slice 740 has its header 744 defined to be at an end portion of slice 740. Similar to FIGS. 7A-7C, the definitions of where these header locations exist within a slice or segment are preferably maintained in the metadata area within lead-in area 22 of FIG. 1. This type of slicing/segmenting depicts the flexibility in defining the shapes of the slices/segments, as defined by the slice/segment header information, in that the slices/segments do not have to necessarily follow or adhere to straight line or concentric circle boundaries. Such configurations may be useful when storing particular types of data, such as steaming video data where long streams of data are written to the media, and writing to a large plurality of contiguous sectors on the media may improve system performance by reducing head positioning time for positioning a head or transducer of a media drive which is attempting to access such data.

While not shown in FIGS. 7A-7D, a media that is further divided to contain, or solely contains, concentric cylinder regions such as those defined by elements 76 and 78 of FIG. 4 similarly has header regions defined for each of such cylinder regions.

Thus, there has been described an improved technique for improving the data integrity of data on a removable storage media, where the probability of being able to successfully read data that has been written to such media is improved due to multiple copies of the data being written to the same storage media at different physical locations on or within the media.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc., in combination with removable storage media.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for storing data on a removable storage media in order to improve subsequent data access reliability, comprising steps of:
    logically dividing the removable storage media into at least three zones, including a first zone, a second zone and a third zone, by writing header information into each of the at least three zones;
    receiving data to be stored on the removable storage media;
    writing the data to the first zone; and
    writing duplicate copies of the data to the second zone and the third zone;
    reading first zone data from the first zone to establish first zone read data;
    reading second zone data from the second zone to establish second zone read data;
    comparing the first zone read data and the second zone read data and if they match, presenting one of the first zone read data and the second zone read data as good data; and
    if the first zone read data and the second zone read data do not match, (i) reading next zone data from a next zone of the at least three zones and determining if a majority of zones read have matching data and if so, presenting one of the majority of zones read as good data and if not, repeating step (i).

2. The method of claim 1 wherein the first zone is located on a first recordable layer of the removable storage media, and the second zone is located on a second recordable layer of the removable storage media.

3. The method of claim 1 wherein the first zone is located within a first concentric ring radially offset by a first distance with respect to a center of the removable storage media, and the second zone is located within a second concentric ring that is co-planar to the first concentric ring and is radially offset by a second distance with respect to the center of the removable storage media.

4. The method of claim 3, wherein the third zone is located within a third concentric ring that is co-planar to the first and second concentric rings and is radially offset by a third distance with respect to the center of the removable storage media.

5. The method of claim 3, wherein the step of logically dividing the removable storage media comprises logically dividing the removable storage media into at least four zones, wherein the first zone and the second zone are both located on a first recordable layer of the removable storage media and the third zone and the fourth zone are both located on a second recordable layer of the removable storage media, and further comprising the step of writing another duplicate copy of the data to the fourth zone.

6. The method of claim 1, further comprising, in response to receipt of a read command for reading the data, steps of:
    reading zone data from the first zone to establish first zone read data;
    determining if the first zone read data is good;
    if the first zone read data is good, presenting the first zone read data as good data;
    if the first zone read data is not good:
        (i) reading data from a next zone to establish next zone read data;
        (ii) determining if the next zone read data is good;
        (iii) if the next zone read data is good, presenting the next zone read data as good data; and
        (iv) if the next zone read data is not good, repeating steps (i)-(iv) for remaining zones associated with the data until a zone is read as being good and presented as good data, and if none of the remaining zones are read as being good, return a read error.

7. A method for storing data on a removable storage media in order to improve subsequent data access reliability, comprising steps of:
    logically dividing the removable storage media into at least three zones, by writing header information into each of the at least three zones;
    receiving data to be stored on the removable storage media;
    writing a duplicate copy of the data to each of the at least three zones; and
    (i) comparing data read from each of a plurality of the zones, and if the data read from a majority of the zones in the plurality matches, presenting the matching data as good data, and otherwise incrementing the plurality of zones by one zone, and repeating step (i).

8. The method of claim 7 wherein a first zone is located on a first recordable layer of the removable storage media, and a second zone is located on a second recordable layer of the removable storage media.

9. The method of claim 7 wherein a first zone is located within a first concentric ring radially offset by a first distance with respect to a center of the removable storage media, and a second zone is located within a second concentric ring that is co-planar to the first concentric ring and is radially offset by a second distance with respect to the center of the removable storage media.

10. The method of claim 9, wherein the step of logically dividing the removable storage media into at least three zones comprises locating a third zone within a third concentric ring that is co-planar to the first and second concentric rings and is radially offset by a third distance with respect to the center of the removable storage media.

11. The method of claim 9, wherein the step of logically dividing the removable storage media into at least three zones comprises logically dividing the removable storage media into at least four zones, including a third zone and a fourth zone in addition to the first zone and the second zone, and wherein the first zone and the second zone are both located on a first recordable layer of the removable storage media and the third zone and the fourth zone are both located on a second recordable layer of the removable storage media.

* * * * *

UNITED STATES PATENT AND TRADEMARK OFFICE
CERTIFICATE OF CORRECTION

PATENT NO. : 7,599,261 B2
APPLICATION NO. : 11/334702
DATED : October 6, 2009
INVENTOR(S) : Achanta et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 832 days.

Signed and Sealed this

Twenty-eighth Day of September, 2010

David J. Kappos
*Director of the United States Patent and Trademark Office*